United States Patent
Sun et al.

(10) Patent No.: US 8,963,608 B1
(45) Date of Patent: Feb. 24, 2015

(54) PEAK-TO-PEAK AVERAGE POWER RATIO REDUCTION AND INTERMODULATION DISTORTION PRE-SUPPRESSION USING OPEN-LOOP SIGNAL PROCESSING

(71) Applicant: L-3 Communications Corp., New York, NY (US)

(72) Inventors: June Y. Sun, Salt Lake City, UT (US); William K. McIntire, Sandy, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 14/267,391

(22) Filed: May 1, 2014

(51) Int. Cl.
*H03K 5/08* (2006.01)
(52) U.S. Cl.
USPC ........... 327/309; 327/317; 375/295; 455/63.1
(58) Field of Classification Search
USPC .................. 327/309, 317; 375/295; 455/63.1
See application file for complete search history.

(56) References Cited

U.S. PATENT DOCUMENTS

| | | | | |
|---|---|---|---|---|
| 4,208,548 A | * | 6/1980 | Orban | 381/94.8 |
| 4,412,100 A | * | 10/1983 | Orban | 381/100 |
| 5,168,526 A | * | 12/1992 | Orban | 381/94.8 |
| 5,737,432 A | * | 4/1998 | Werrbach | 381/94.1 |
| 5,749,051 A | * | 5/1998 | Dent | 455/324 |
| 6,337,999 B1 | * | 1/2002 | Orban | 700/94 |
| 7,127,211 B2 | | 10/2006 | Hildebrand et al. | |
| 7,346,134 B2 | | 3/2008 | Smith | |
| 2007/0184782 A1 | | 8/2007 | Sahota et al. | |
| 2008/0232268 A1 | | 9/2008 | Kahrizi et al. | |

* cited by examiner

*Primary Examiner* — Kenneth B. Wells
(74) *Attorney, Agent, or Firm* — Kirton McConkie

(57) ABSTRACT

The peak-to-average power ratio of an input signal can be reduced prior to amplification. This reduction in the peak-to-average power ratio can be accomplished without adding significant intermodulation distortion to the input signal. The resulting input signal can therefore have a peak-to-average power ratio that does not exceed the output backoff of the amplifier thereby preventing the amplifier from being operated in saturation and, as a result, minimizing the intermodulation distortion added by the amplifier. The peak-to-average power ratio of an input signal can be reduced using two stages of signal clipping. By employing two stages, the intermodulation distortion introduced to the input signal as it passes through the stages is minimized. Also, because this two-stage approach does not attempt to account for intermodulation distortion introduced by the downstream amplifier, it can be implemented without any prior knowledge of the amplifier's transfer function or any output monitoring scheme.

22 Claims, 6 Drawing Sheets

PEAK-TO-PEAK AVERAGE POWER RATIO REDUCTION AND INTERMODULATION DISTORTION PRE-SUPPRESSION USING OPEN-LOOP SIGNAL PROCESSING

BACKGROUND

A power amplifier operates by converting DC supply power into radio frequency (RF) energy that is used to amplify an input RF signal. The efficiency at which a power amplifier is able to convert the DC power into RF energy is maximized at or near the power amplifier's saturation point (i.e. the nearer the power level of the RF input signal is to the saturation point, the higher the amplifier's efficiency will be). For this reason, it is desirable to operate a power amplifier as close to its saturation point as possible.

When an RF input signal has a low peak-to-average power ratio (i.e. when the power level of the RF input signal has little variation), a power amplifier can be operated near the saturation point since the peaks in the input power do not cause the amplifier to operate past the saturation point. In contrast, when an RF input signal has a high peak-to-average power ratio (i.e. when the power level of the RF input signal varies substantially), it is necessary to operate the power amplifier at a significant backoff, meaning at a reduced power level that ensures that the peaks in the input power do not cause the amplifier to operate past its saturation point. As a power amplifier is operated beyond its saturation point, the amount of distortion introduced into the output signal increases dramatically due to clipping. In addition to the loss of data caused by the clipping, because the clipping is a non-linear process, it introduces a significant amount of intermodulation distortion to the output signal.

FIG. 1 illustrates the concept of operating a power amplifier with backoff. FIG. 1 depicts the output power vs. the input power for an example power amplifier. As shown, any portion of an input signal that is amplified while the amplifier is operating in saturation will receive little or no amplification resulting in the clipping of the input signal. To minimize this clipping and the resultant distortion introduced by clipping, the power level of the input signal will be controlled (e.g. reduced) so that the entire signal will be amplified within the linear region of the amplifier. FIG. 1 represents a scenario where an input signal with a high peak-to-average power ratio is amplified. To ensure that the peaks of the input signal do not drive the amplifier into saturation, the power level of the input signal is controlled so that the peak power level is below the saturation point. Because of this, only small portions of the input signal (e.g. those that are at the peak power level as shown by the vertical line for the peak power level) are amplified within the amplifier's most efficient range. The majority of the input signal (represented by the vertical line for the average power level) is amplified at a lower efficiency.

In many cases, it is not desirable or possible to operate an amplifier completely within its linear region (i.e. with an adequate output backoff to ensure that the peak levels of the input signal do not cause the amplifier to go into saturation). This may be the case with multicarrier signals that exhibit very high peak-to-average power ratios. In such cases, the peak power levels of the input signal will extend into the saturation region of the amplifier. In reference to FIG. 1, this can be visualized as the vertical line for the peak power being shifted to the right into the saturation region.

To address these situations where the high peak-to-average power ratio of an input signal causes an amplifier to extend into saturation, various approaches have been created to account for the intermodulation distortion introduced into the output. These approaches involve introducing pre-distortion into the input signal that is intended to offset the distortion that will be caused when the input signal is amplified. More specifically, any portion of the signal that is amplified in the saturation region will experience clipping. This clipping introduces intermodulation distortion to the output signal. These approaches account for the intermodulation distortion added during amplification by employing appropriate circuitry and/or logic prior to amplification that add pre-distortion to the input. The pre-distortion then offsets the distortion added during amplification. To implement such approaches, either the nonlinear transfer characteristics of the amplifier must be known a priori or a monitoring scheme must be used to analyze the output signal to dynamically determine the distortion so that the appropriate pre-distortion can be applied to the input signal. In other words, these approaches attempt to cancel intermodulation distortion experienced in a power amplifier by predicting the intermodulation distortion and pre-compensating the signal with the inverse intermodulation distortion.

The above discussion assumes that the amplifier is being operated with a linearizer. A linearizer pre-distorts the input signal and increases its peak-to-average power ratio in a way that is exactly compensated by the amplifier. The use of a linearizer therefore serves to extend the linear range of the amplifier up to the point of clipping.

Additionally, the phase of an amplifier is also dependent on the power of the input signal. Therefore, as the power level of the input signal increases, more phase distortion will be introduced during amplification. A linearizer can also be used to account for such distortion by pre-distorting the phase of the input signal so that the input signal is amplified with a constant phase shift up to the point of clipping.

A linearizer can therefore be used to minimize distortion by using pre-distortion to yield a linear response up to the point of clipping. However, even with the use of a linearizer, an input signal with a high peak-to-average power ratio will still require operation at significant output backoff to avoid distortion that would be generated by clipping.

SUMMARY

The present invention is generally directed to methods, circuits, and systems for reducing the peak-to-average power ratio of an input signal prior to amplification. This reduction in the peak-to-average power ratio can be accomplished without adding significant intermodulation distortion to the input signal. The resulting input signal can therefore have a peak-to-average power ratio that does not exceed the output backoff of the amplifier thereby preventing the amplifier from being operated in saturation and, as a result, minimizing the intermodulation distortion added by the amplifier.

The peak-to-average power ratio of an input signal can be reduced using two stages of signal clipping. By employing two stages, the intermodulation distortion introduced to the input signal as it passes through the stages is minimized. Also, because this two-stage approach does not attempt to account for intermodulation distortion introduced by the downstream amplifier, it can be implemented without any prior knowledge of the amplifier's transfer function or any output monitoring scheme. However, further benefits can be achieved by employing the techniques of the present invention in conjunction with a linearizer tailored to the amplifier's transfer function.

In one embodiment, the present invention is implemented as a method for reducing the peak-to-average power ratio of an input signal prior to the input signal being input to a power amplifier. An input signal is passed through a first clipper to generate a first clipped version of the input signal. The first clipped version includes first intermodulation distortion caused as the first clipper clips the input signal. The input signal is then used to isolate the first intermodulation distortion from the first clipped version of the input signal. The first intermodulation distortion is inverted either before or after it is isolated. The inverted and isolated first intermodulation distortion is then added to the input signal to generate a second version of the input signal. The second version of the input signal is then passed through a second clipper to generate a third version of the input signal. Upon clipping the second version of the input signal, the second clipper generates second intermodulation distortion that is substantially offset by the first intermodulation distortion present within the second version of the input signal such that the third version of the input signal has a reduced peak-to-average power ratio without containing substantial intermodulation distortion caused by the first and second clippers.

In another embodiment, the present invention is implemented as a system for reducing the peak-to-average power ratio of an input signal prior to the input signal being input to a power amplifier. The system includes: a first clipper configured to receive an input signal and generate a first clipped version of the input signal, the first clipped version including first intermodulation distortion caused as the first clipper clips the input signal; a first adder configured to use the input signal to isolate the first intermodulation distortion from the first clipped version of the input signal; a component for inverting the first intermodulation distortion; a second adder configured to add the isolated and inverted first intermodulation distortion to the input signal to generate a second version of the input signal; and a second clipper configured to clip the second version of the input signal to generate a third version of the input signal. The isolated first intermodulation distortion in the second version of the input signal substantially offsets second intermodulation distortion generated when the second clipper clips the second version of the input signal.

In another embodiment, the present invention is implemented as a digital circuit. The digital circuit comprises: logic for clipping an input signal to generate a first clipped version of the input signal, the first clipped version including first intermodulation distortion caused as the first clipper clips the input signal; logic for using the input signal to isolate the first intermodulation distortion from the first clipped version of the input signal; logic for inverting the first intermodulation distortion; logic for adding the isolated and inverted first intermodulation distortion to the input signal to generate a second version of the input signal; and logic for clipping the second version of the input signal to generate a third version of the input signal.

In each of these embodiments, one or more coefficients can be used to scale the signal during the two-stage approach to further minimize any residual intermodulation distortion that may otherwise be present in the input signal after the two-stage approach.

DETAILED DESCRIPTION OF EXEMPLARY EMBODIMENTS

Figure 1:
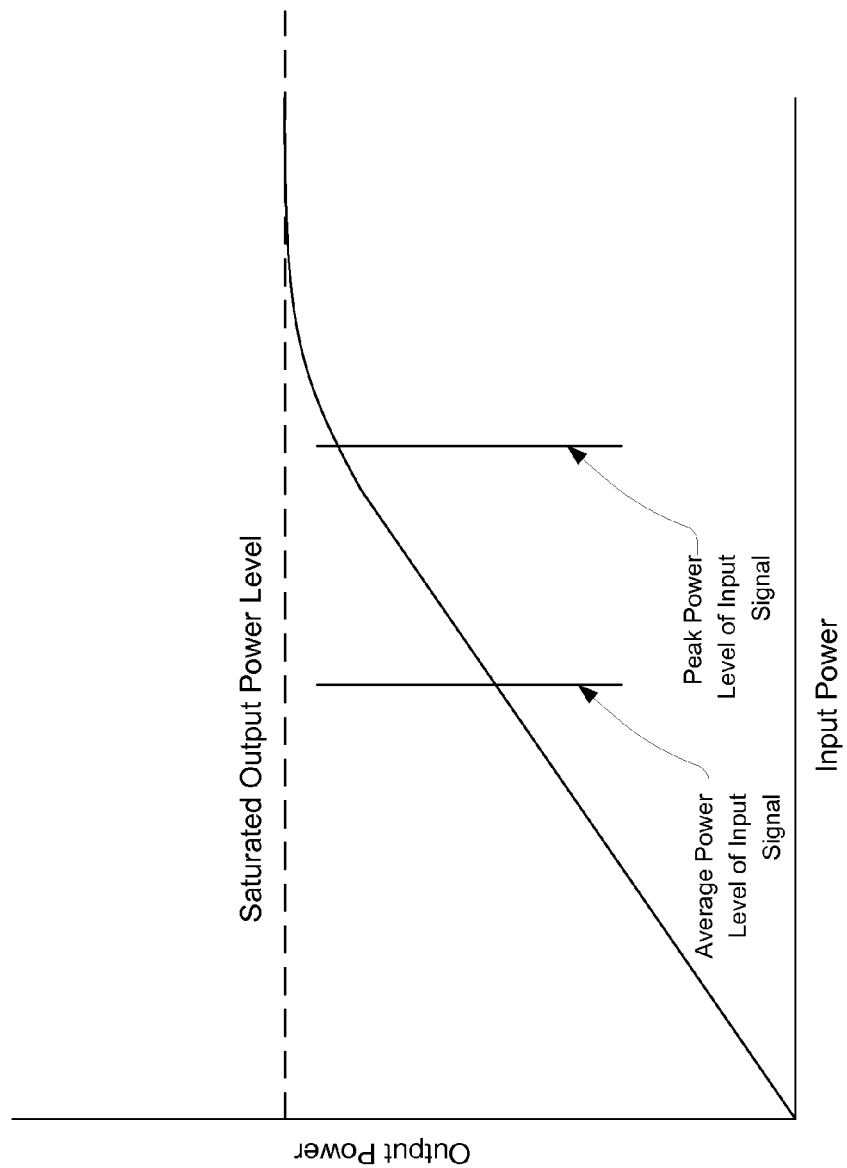
FIG. 1 illustrates an example of operating a power amplifier with output backoff to prevent the amplifier from being driven into saturation.

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As an overview, the present invention generally provides an open-loop nonlinear processing technique that can be employed to precondition a multicarrier waveform (or other waveform having a high peak-to-average power ratio) such that the resultant waveform exhibits both a suppressed intermodulation distortion level and a controlled and reduced peak-to-average power ratio. The processing technique can be implemented digitally or in the analog domain. A multi-carrier signal preconditioned with this technique will be highly immune to intermodulation distortion regrowth when fed through a power amplifier that exhibits good linearity up to its saturation point as long as the power amplifier is backed off by an amount that is equal to or greater than the target peak-to-average power ratio of the preconditioned waveform. Accordingly, by employing the processing technique of the present invention, any linearized power amplifier can be operated much closer to its saturation point without clipping or otherwise distorting the waveform.

The processing technique of the present invention can be implemented using two-stages of clipping for reducing the peak-to-average power ratio of an input signal to a desired level. In the first stage, intermodulation distortion can be introduced to the input signal which will substantially offset intermodulation distortion generated in the second stage. The signal output from the second stage will therefore have a reduced peak-to-average power ratio, but will also exhibit very little intermodulation distortion.

In this specification and in the claims, the term clipper will be used to refer to a nonlinear element that has a linear response up to a point of saturation. Beyond the point of saturation, the nonlinear element will produce a nonlinear response resulting in distortion. Therefore, the term clipping should be construed in this specification and in the claims as the application of the nonlinear response to a signal as the signal is processed by the nonlinear element beyond its saturation point. Examples of a clipper include an amplifier and a limiter. However, other types of nonlinear elements could also be used.

Figure 2:
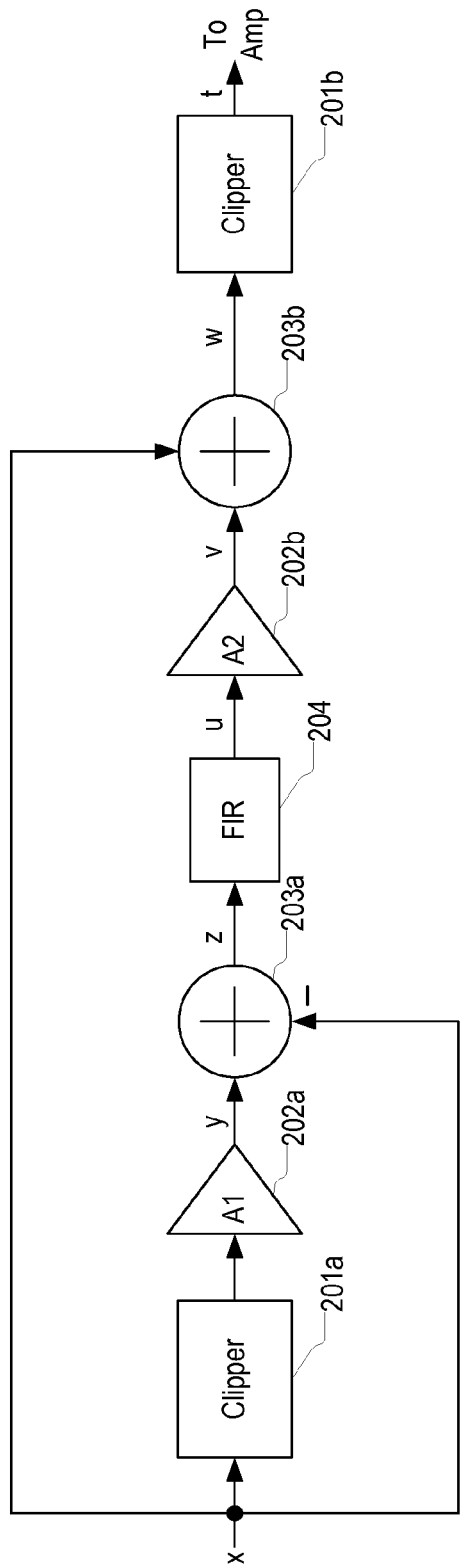
FIG. 2 illustrates a circuit diagram of an example circuit for implementing two stages of clipping to reduce the peak-to-average power ratio of an input signal without adding significant intermodulation distortion to the input signal.

FIG. 2 illustrates a circuit diagram of an example circuit that can be used to perform two stages of clipping on an input signal to reduce the peak-to-average power ratio of the input signal. As shown, an input signal x is provided to a first clipper 201a. Clipper 201a comprises a circuit that is configured to prevent the output of the circuit from exceeding a threshold. For example, a clipper can be configured to limit the output of the circuit to 0 dB such that any portion of an input signal that would otherwise exceed 0 dB at output would be limited, or clipped, to 0 dB. In a particular example, a clipper can be comprised of an amplifier where the amplifier's transfer function (i.e. its saturation point) is used to control which portions of the input get clipped.

As described above, clipping is a non-linear process and therefore introduces intermodulation distortion to the clipped signal. The two-stage clipping approach of the present invention employs the intermodulation distortion generated in a first clipping stage (i.e. when clipper 201a clips input signal x) to generate a modified version of input signal x that contains intermodulation distortion that will offset intermodulation distortion caused in the second clipping stage (i.e. when clipper 201b clips the modified version of input signal x).

This generation of the modified version of input signal x is carried out in the components positioned between clippers 201a and 201b. As shown, the output of clipper 201a (which comprises the clipped input signal x along with the intermodulation distortion generated by clipping) is passed through a coefficient component 202a that scales the signal by a coefficient A1. As will be further described below, the use of a separate coefficient component 202a to apply coefficient A1 is not required to implement the two stage approach. The scaling by A1 can alternatively be implemented by integrating A1 into the gain of clipper 201a. The role and relationship of coefficients A1 and A2 will be further described below.

The signal output from coefficient component 202a (or from clipper 201a if coefficient A1 is built into the gain of clipper 201a) is then input to an adder 203a. Accordingly, the first input to adder 203a (identified as y in FIG. 2) comprises a scaled (by A1) version of the clipped input signal x and intermodulation distortion generated when x was clipped. The second input to adder 203a is the negative of input signal x. Accordingly, adder 203a subtracts the original input signal x from y yielding signal z. Signal z is therefore the intermodulation distortion scaled by A1. In essence, clipper 201a and adder 203a are employed to isolate the intermodulation distortion that is generated by clipper 201a. The isolation of the intermodulation distortion can also be accomplished by inverting signal y (e.g. using a negative value for coefficient A1) and then adding input signal x to the inverted signal y.

Signal z is then filtered by FIR filter 204. FIR filter 204 can have a band-pass response to effectively remove selected intermodulation distortion (e.g. those that are outside of the bandwidth of input signal x). FIR filter 204 is an optional component that can increase the performance of the circuit, but is not necessary to implement the techniques described herein. In some embodiments, the bandwidth of FIR filter 204 can match the bandwidth of input signal x, while in other embodiments FIR filter 204 may have a bandwidth that does not match the bandwidth of input signal x.

The filtered signal (identified as u in FIG. 2) is then passed through coefficient component 202b which scales the filtered signal by a coefficient A2. The use of a separate coefficient component 202b is not required to implement the two stage approach. The scaling by A2 can alternatively be implemented by integrating A2 into the coefficients of FIR filter 204. The resulting signal (referred to as v in FIG. 2) is therefore the isolated and filtered intermodulation distortion caused by clipper 201a scaled by coefficients A1 and A2. In some embodiments, FIR filter 204 and coefficient component 202b can be swapped so that coefficient A2 is applied prior to the signal being filtered. Further, FIR filter 204 can also be placed in other positions of the circuit including prior to adder 203a and after adder 203b. In some embodiments, multiple filters can be used.

Coefficients A1 and A2 have an inverse relationship. This inverse relationship can be implemented in various ways. For example, in FIG. 2, it is assumed that coefficient A1 is positive while coefficient A2 is negative. Accordingly, the application of coefficient A2 functions to invert the intermodulation distortion. This inverting of the intermodulation distortion can also be accomplished by making coefficient A1 negative (which would require adding signal x to the inverted signal y as described above and making coefficient A2 positive). Accordingly, the terms "adding" and "subtracting" should be construed as interchangeable as long as this inverse relationship is maintained.

In addition to this inverse relationship, in some embodiments, coefficients A1 and A2 can also comprise static level adjustments (i.e. magnitudes) that scale the corresponding signal up or down. The magnitude of each coefficient can be determined ahead of time to minimize any residual intermodulation distortion that may exist after the signal passes through clipper 201b. Optimal values for each coefficient may be determined for each of various waveforms and for various circuit parameters. For example, a set of optimal values may be determined based on the number of carriers in the waveform, a modulation type of the input signal, and/or the output backoff of the power amplifier. In some embodiments, coefficients A1 and A2 can also have a phase component. Such may be the case in analog implementations.

Signal v is input to adder 203b which adds signal v to the original input signal x yielding signal w. Signal v is configured so that when combined with input signal x, it will offset the intermodulation distortion caused when signal w is clipped by clipper 201b. In other words, signal v is configured so that the output of clipper 201b (referred to as t in FIG. 2) is a clipped version of input signal x without substantial intermodulation distortion. The intermodulation distortion that would otherwise be present in an output from clipper 201b is offset due to the presence of signal v in the signal w.

Signal t is therefore a version of input signal x that has a reduced peak-to-average power ratio (due to the clipping performed in clipper 201b) and also has minimal intermodulation distortion (due to the offset caused by including signal v in the input to clipper 201b). Because signal t has a reduced peak-to-average power ratio, it can be subsequently amplified without being clipped. In other words, by employing the two-stage clipping approach of the present invention, a signal t can be produced that has a peak-to-average power ratio that is less than or equal to the operating average power output backoff (OBO) of a power amplifier.

By scaling the signal by coefficients A1 and A2, signal t can be optimized to have minimal intermodulation distortion. In other words, by using the two-stage approach, the peak-to-average power ratio of input signal x can be reduced without introducing substantial intermodulation distortion to the signal. A1 and A2 can be used to further minimize any residual intermodulation distortion that may otherwise appear in signal t.

Figure 3A:
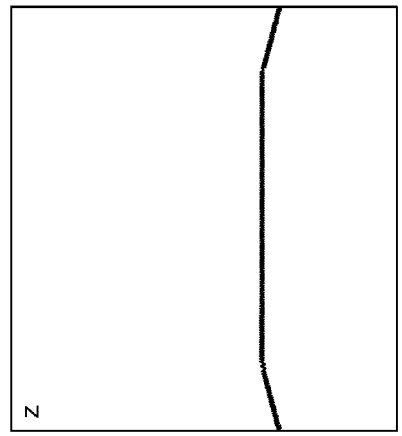
FIGS. 3A-3F illustrate sample plots in the frequency domain of the input signal at various locations within the two-stage clipping approach.

FIGS. 3A-3F provide plots in the frequency domain of an example signal that is processed through the circuit depicted in FIG. 2. FIG. 3A depicts the input signal x. As shown, signal x comprises eight carriers and is therefore an example of a multicarrier waveform that will have a high peak-to-average power ratio. To reduce the peak-to-average power ratio, signal x can be passed through the circuit of FIG. 2.

Figure 3B:
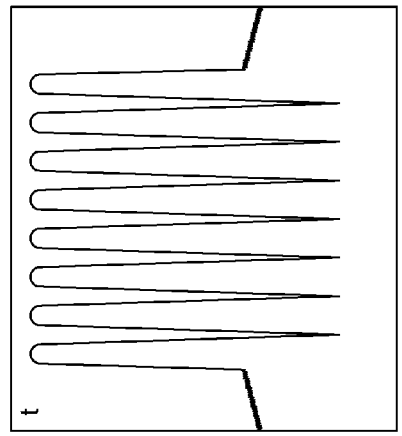
Figure 3C:
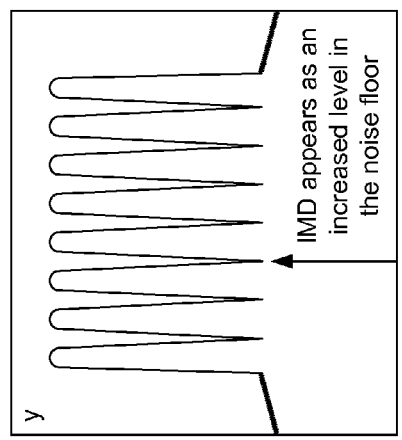
Figure 3D:
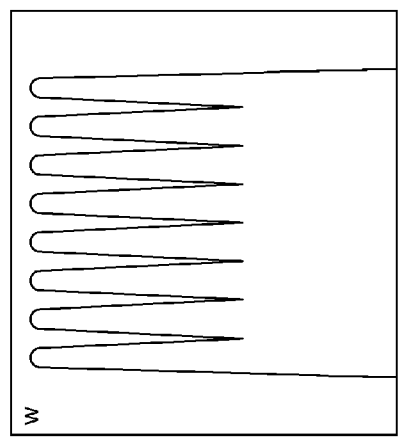

FIG. 3B represents signal y which is the clipped version of signal x, including the intermodulation distortion, scaled by coefficient A1. The intermodulation distortion present in signal y is represented by the increase in the noise floor. FIG. 3C represents signal z which is the intermodulation distortion (scaled by coefficient A1) that remains after input signal x is subtracted from signal y. FIG. 3D represents signal v which is the intermodulation distortion after it has been filtered to have a bandwidth consistent with the bandwidth of input signal x and after this filtered intermodulation distortion has been scaled by coefficient A2. Signal v comprises the necessary signal to offset intermodulation distortion generated when the combination of input signal x and signal v is clipped in clipper 201b.

Figure 3E:
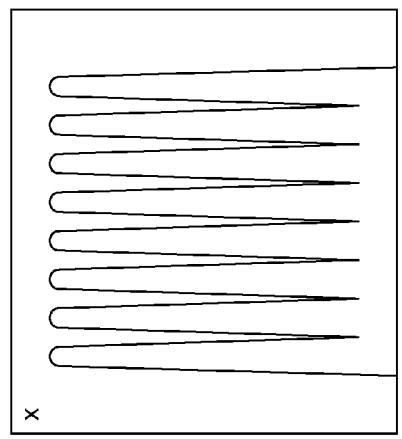
Figure 3F:
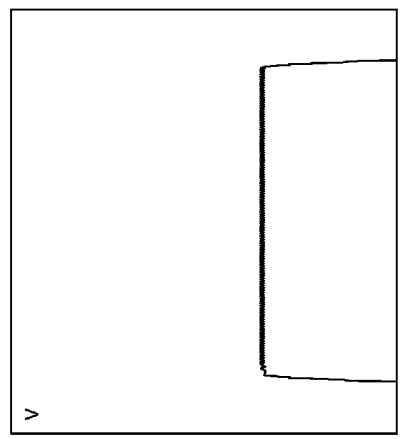

FIG. 3E represents signal w which is the sum of original input signal x and signal v. Signal w includes components that will offset intermodulation distortion that is generated when signal w is passed through clipper 201b. The resultant signal t output by clipper 201b is represented in FIG. 3F. Signal t is a version of original input signal x having a reduced peak-to-average power ratio and minimal intermodulation distortion over the bandwidth of input signal x.

By reducing the peak-to-average power ratio of the input signal, the present invention can allow a downstream power amplifier to be operated at a lower output backoff. As a result, the amplification of the input signal prior to transmission can be performed more efficiently. In some embodiments of the invention, to maximize the ability of the power amplifier to be operated at an output backoff as low as the reduced peak-to-average power ratio of the input signal, the power amplifier can be linearized. This linearization can be performed using either an analog linearizer or a digital linearization stage positioned between the circuit of FIG. 2 and the power amplifier.

Figure 4:
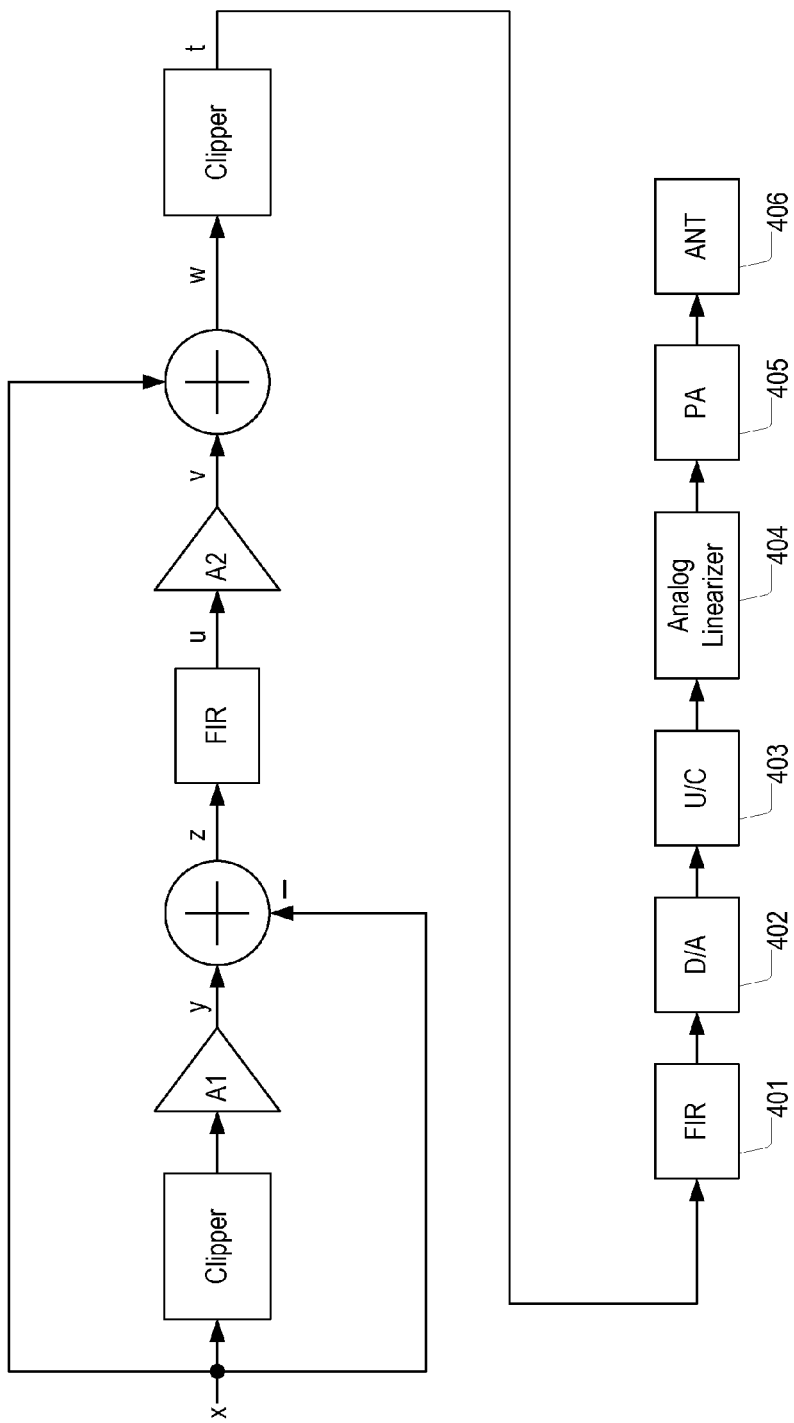
FIG. 4 illustrates a circuit diagram of the example circuit of FIG. 2 when an analog linearizer is used to linearize the power amplifier.

FIG. 4 illustrates the circuit of FIG. 2 in conjunction with an analog linearizer for linearizing a power amplifier 405. As shown, signal t can be passed through an optional filter 401, a DAC 402, an upconverter 403, and an analog linearizer 404 prior to being input to power amplifier 405. In many implementations, this configuration will allow power amplifier 405 to be operated with an output backoff that is as low as the peak-to-average power ratio of signal t thereby maximizing the power of the signal output to antenna 406.

Figure 5:
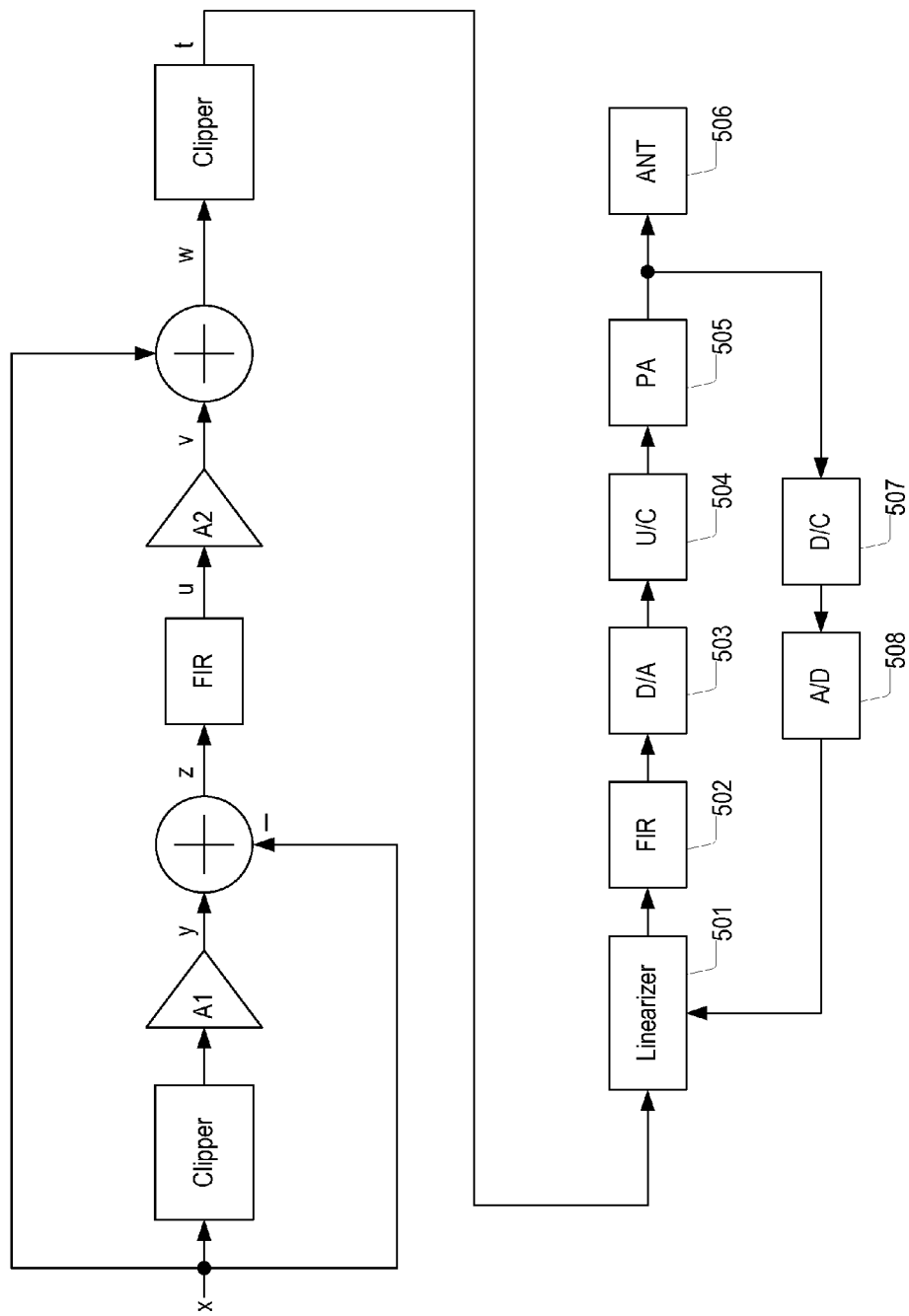
FIG. 5 illustrates a circuit diagram of the example circuit of FIG. 2 when a digital linearization stage is employed to linearize the power amplifier.

FIG. 5 illustrates the circuit of FIG. 2 in conjunction with a digital linearization stage for linearizing a power amplifier 505. As shown, signal t can be passed through a digital linearizer 501, an optional filter 502, a DAC 503, and an upconverter 504 prior to being input to power amplifier 505. In many implementations, this configuration will allow power amplifier 505 to be operated with an output backoff that is as low as the peak-to-average power ratio of signal t thereby maximizing the power of the signal output to antenna 506. The output of power amplifier 505 can be fed back to linearizer 501 (via down converter 507 and ADC 508) to dynamically control the function of linearizer 501.

The examples shown in FIGS. 4 and 5 assume that the circuit of FIG. 2 is a digital circuit. However, the circuit of FIG. 2 can also be implemented as an analog circuit. In an analog implementation, coefficients A1 and A2 can have a phase component to implement the appropriate scaling as described above.

Figure 6:
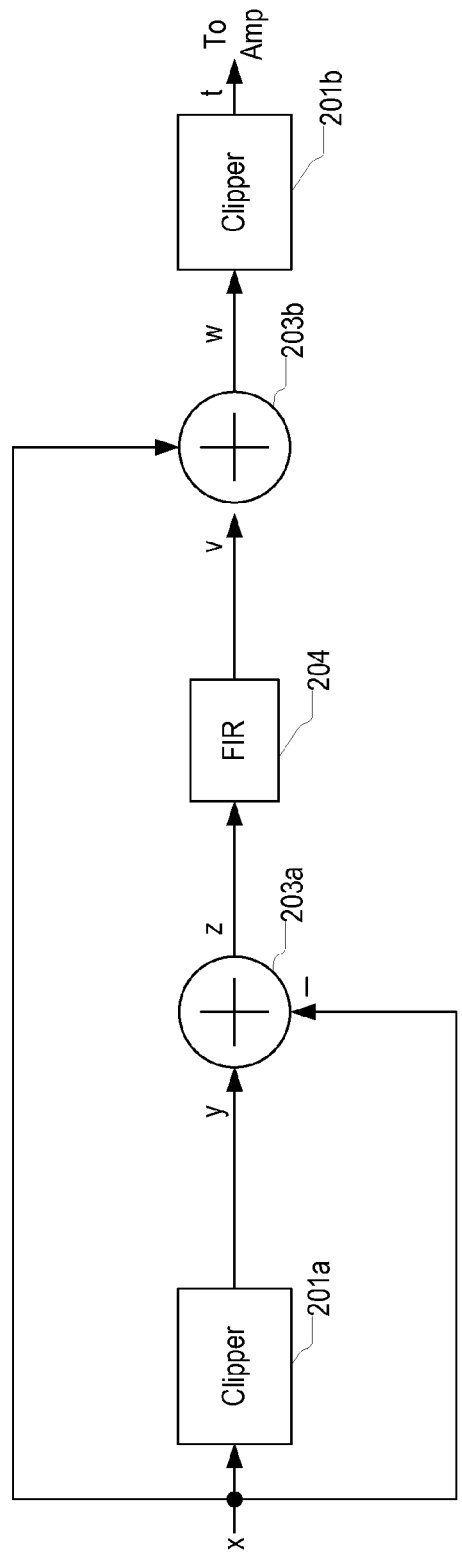
FIG. 6 illustrates the circuit diagram of FIG. 2 when the scaling by coefficients A1 and A2 is provided within the first clipper and the filter respectively.

FIG. 6 illustrates an example of the circuit of FIG. 2 when coefficients A1 and A2 are built into clipper 201a and FIR filter 204 respectively. In this case, the scaling provided by coefficient A1 can be built into the gain of clipper 201a while the scaling provided by coefficient A2 can be built into the coefficients of FIR filter 204 as described above. The scaling provided by these coefficients allows the two-stage approach to be fine-tuned to a particular waveform or circuit configuration to minimize the amount of residual intermodulation distortion that would otherwise appear in the signal after passing through clipper 201b.

Although the above description has generally described the use of two coefficients, in some implementations, only one of the coefficients A1 and A2 may be applied to the signal as long as the coefficient is employed to invert the intermodulation distortion that is added back to the input signal However, in some implementations, the use of separate coefficients may be preferred since an optimal response may be obtained by applying the magnitudes (and possibly phases) of the coefficients at different locations within the two-stage approach.

In some implementations, the above described two-stage approach can be cascaded to achieve greater reduction in the peak-to-average power ratio. For example, the circuit depicted in FIG. 2 could be repeated to give a total of four stages through which a signal could pass prior to being amplified.

To summarize, embodiments of the present invention provide means for reducing the peak-to-average power ratio of a signal to be input to a power amplifier. The reduction in the peak-to-average power ratio can be carried out using a two-stage approach that minimizes the amount of intermodulation distortion that is introduced into the input signal. The first stage can be used to generate and introduce intermodulation distortion into the input signal that will effectively offset intermodulation distortion generated in the second stage when the signal is clipped. By minimizing the peak-to-average power ratio of the input signal in this way, the power amplifier can be operated much closer to its saturation point without clipping the input signal thereby avoiding introduction of additional intermodulation distortion that would otherwise occur if the signal were clipped in the power amplifier.

Additionally, the two-stage approach of the present invention can be implemented independently of the linearization of the power amplifier. As such, the two-stage approach does not require any knowledge of the power amplifier's transfer function to be effective because the suppression of the intermodulation distortion caused within the two-stage approach is carried out in an open-loop fashion well before the signal is amplified by the power amplifier.

Further, the two-stage approach is highly accurate, predictable, repeatable, and immune to performance degradations caused by variations in environmental factors (such as temperature swings) because the intermodulation suppression is performed independent of the downstream power amplifier (e.g. it does not require feedback from the power amplifier). Also, as is apparent from FIG. 2, a circuit for implementing the two-stage approach can be very simple and require an insignificant amount of FPGA resources to implement.

Although specific embodiments and applications of the invention have been described in this specification, these embodiments and applications are exemplary only, and many variations are possible.

We claim:

1. A method for reducing the peak-to-average power ratio of an input signal prior to the input signal being input to a power amplifier, the method comprising:
   passing an input signal through a first clipper to generate a first clipped version of the input signal, the first clipped version including first intermodulation distortion caused as the first clipper clips the input signal;
   using the input signal to isolate the first intermodulation distortion from the first clipped version of the input signal;
   inverting the first intermodulation distortion;
   adding the inverted and isolated first intermodulation distortion to the input signal to generate a second version of the input signal; and
   passing the second version of the input signal through a second clipper to generate a third version of the input signal, wherein upon clipping the second version of the input signal, the second clipper generates second intermodulation distortion that is substantially offset by the first intermodulation distortion present within the second version of the input signal such that the third version of the input signal has a reduced peak-to-average power ratio without containing substantial intermodulation distortion caused by the first and second clippers.

2. The method of claim 1, further comprising scaling the first clipped version of the input signal by one or both of a first coefficient and a second coefficient.

3. The method of claim 2, wherein the scaling by the first coefficient is applied by the first clipper.

4. The method of claim 1, wherein the first intermodulation distortion is inverted either prior to being isolated or after being isolated from the first clipped version of the input signal.

5. The method of claim 1, further comprising one or more of:
   filtering the first clipped version of the input signal;
   filtering the first intermodulation distortion; or
   filtering the second version of the input signal.

6. The method of claim 5, wherein filtering the first intermodulation distortion comprises scaling the isolated first intermodulation distortion by a coefficient.

7. The method of claim 2, wherein at least one of the first and second coefficients has a magnitude or phase that is configured to minimize residual intermodulation distortion that may appear in the third version of the input signal.

8. The method of claim 7, wherein the first and second coefficients are selected based on one or combinations of:
   a number of carriers in the input signal;
   a modulation type of the input signal; and
   an operating average power output backoff of the power amplifier to which the third version of the input signal is input.

9. The method of claim 1, wherein one or both of the first and second clippers comprise amplifiers.

10. The method of claim 1, further comprising:
    passing the third version of the input signal to the power amplifier.

11. The method of claim 10, wherein the power amplifier is linearized.

12. The method of claim 10, wherein the reduced peak-to-average power ratio is equal to or less than the operating average power output backoff of the power amplifier.

13. A system for reducing the peak-to-average power ratio of an input signal prior to the input signal being input to a power amplifier, the system comprising:
    a first clipper configured to receive an input signal and generate a first clipped version of the input signal, the first clipped version including first intermodulation distortion caused as the first clipper clips the input signal;
    a first adder configured to use the input signal to isolate the first intermodulation distortion from the first clipped version of the input signal;
    a component for inverting the first intermodulation distortion;
    a second adder configured to add the isolated and inverted first intermodulation distortion to the input signal to generate a second version of the input signal; and
    a second clipper configured to clip the second version of the input signal to generate a third version of the input signal, wherein the isolated first intermodulation distortion in the second version of the input signal substantially offsets second intermodulation distortion generated when the second clipper clips the second version of the input signal.

14. The system of claim 13, further comprising:
    a filter that filters the isolated first intermodulation distortion.

15. The system of claim 13, further comprising:
    means for scaling the first clipped version of the input signal by a first coefficient; and
    means for scaling the isolated first intermodulation distortion by a second coefficient.

16. The system of claim 15, wherein the first and second coefficients are selected based on one or combinations of:
    a number of carriers in the input signal;
    a modulation type of the input signal; and
    an operating average power output backoff of a power amplifier to which the third version of the input signal is input.

17. The system of claim 15, wherein at least one of the first and second coefficients has a magnitude or phase that is configured to minimize residual intermodulation distortion that would otherwise be present in the third version of the input signal.

18. The system of claim 13, further comprising:
    a linearization circuit for linearizing the power amplifier.

19. A digital circuit comprising:
    logic for clipping an input signal to generate a first clipped version of the input signal, the first clipped version including first intermodulation distortion caused as the first clipper clips the input signal;
    logic for using the input signal to isolate the first intermodulation distortion from the first clipped version of the input signal;
    logic for inverting the first intermodulation distortion;
    logic for adding the isolated and inverted first intermodulation distortion to the input signal to generate a second version of the input signal; and
    logic for clipping the second version of the input signal to generate a third version of the input signal.

20. The digital circuit of claim 19, wherein the logic is implemented in either or both an FPGA and an ASIC.

21. The digital circuit of claim 19, further comprising:
    logic for scaling the first intermodulation distortion.

22. The digital circuit of claim 19, further comprising:
    logic for filtering one or more of:
       the first clipped version of the input signal;
       the first intermodulation distortion; or
       the second version of the input signal.

* * * * *